(No Model.)
M. PAYNE.
SULKY.
No. 307,679. Patented Nov. 4, 1884.
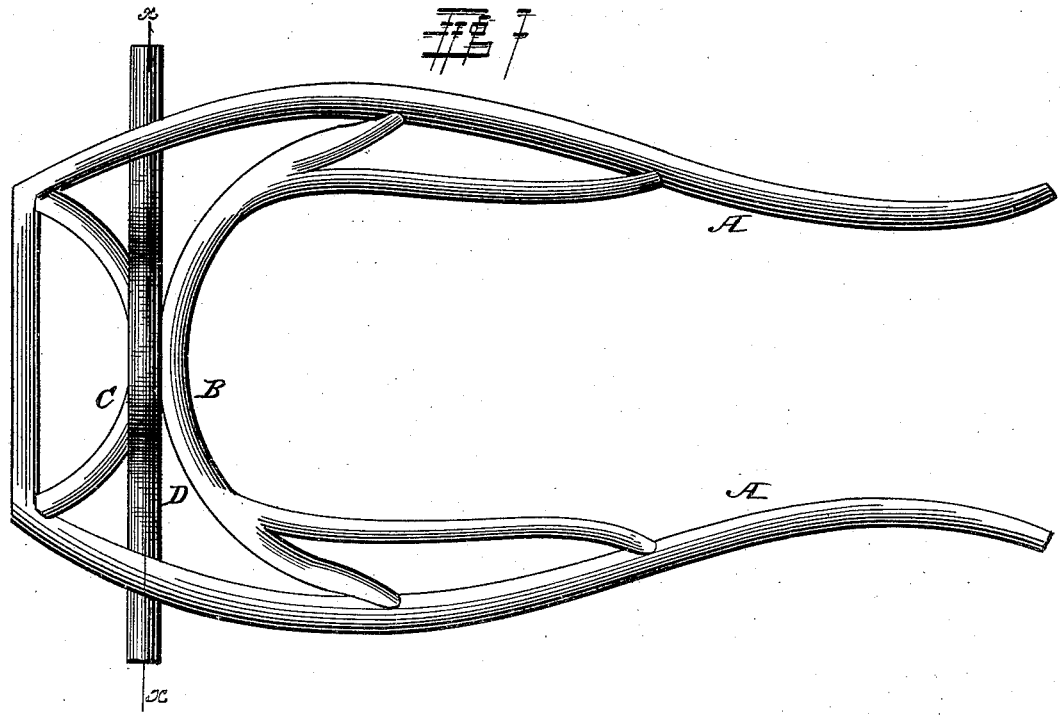
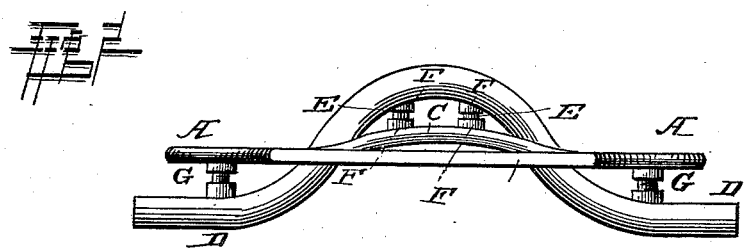
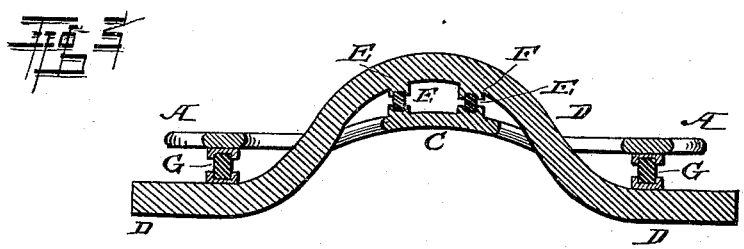
WITNESSES:
Fred. G. Dieterich.
Wm. N. Denton.
INVENTOR.
Martin Payne,
by Louis Bagger & Co.
ATTORNEYS.

UNITED STATES PATENT OFFICE.

MARTIN PAYNE, OF TROY, NEW YORK.

SULKY.

SPECIFICATION forming part of Letters Patent No. 307,679, dated November 4, 1884.

Application filed June 23, 1884. (No model.)

*To all whom it may concern:*

Be it known that I, MARTIN PAYNE, a citizen of the United States, and a resident of Troy, in the county of Rensselaer and State of New York, have invented certain new and useful Improvements in Sulkies; and I do hereby declare that the following is a full, clear, and exact description of the invention, which will enable others skilled in the art to which it appertains to make and use the same, reference being had to the accompanying drawings, which form a part of this specification, and in which—

Figure 1 is a top view of the shafts and axle of my improved sulky. Fig. 2 is a rear view of the same, and Fig. 3 is a vertical section on line $x\,x$, Fig. 1.

Similar letters of reference indicate corresponding parts in all the figures.

My invention has relation to the shafts and running-gear of sulkies; and it consists in the improved construction and combination of parts of the same, as hereinafter more fully described and claimed.

In the accompanying drawings, the letter A indicates the shafts, B the circle-bar, and C the arched brace-bar, which are of the same construction as the corresponding parts in my former patent of the 16th day of January, 1883, and therefore need no further description.

D is the axle, which is arched upward at its middle and passed upward between the rear ends of the shafts and the circle-bar and brace-bar, above the united portions of the said bars and under the rear ends of the shafts. Two blocks, E E, of rubber or similar material, are placed between the united portions of the circle and brace bar and the arched portion of the axle, resting with their ends in flanged sockets F upon the said bars and axle, and similar blocks, G G, are secured between the rear portions of the shafts and the outer portions of the axle, thus cushioning the connections between the axle and the shafts.

Having thus described my invention, I claim and desire to secure by Letters Patent of the United States—

The combination, in a sulky of the described construction, of the circle and brace bars provided with sockets upon the upper side of their united portion, the axle curved to form an arch at its middle and provided with sockets upon its under side, the shafts, and the elastic or yielding blocks placed between the middle of the axle and the united portion of the circle and brace bars and between the ends of the axle and the rear ends of the shafts, as and for the purpose shown and set forth.

In testimony that I claim the foregoing as my own I have hereunto affixed my signature in presence of two witnesses.

MARTIN PAYNE.

Witnesses:
 CHARLES E. LANSING,
 JOHN J. BUCKLEY.